US008844579B2

(12) United States Patent
Eguchi et al.

(10) Patent No.: US 8,844,579 B2
(45) Date of Patent: Sep. 30, 2014

(54) FLEXIBLE VIBRATION ABSORBING TUBE

(75) Inventors: Yoshihiko Eguchi, Saitama (JP); Masahiko Higuchi, Saitama (JP); Kouji Harada, Saitama (JP); Yoshiyuki Gushiken, Saitama (JP); Jun Fukazawa, Gunma (JP)

(73) Assignees: Honda Motor Co., Ltd., Tokyo (JP); Sankei Giken Kogyo Kabushiki Kaisha, Tokyo (JP)

( * ) Notice: Subject to any disclaimer, the term of this patent is extended or adjusted under 35 U.S.C. 154(b) by 1036 days.

(21) Appl. No.: 12/893,233

(22) Filed: Sep. 29, 2010

(65) Prior Publication Data

US 2011/0073209 A1   Mar. 31, 2011

(30) Foreign Application Priority Data

Sep. 30, 2009   (JP) .................................. 2009-228073

(51) Int. Cl.
| | |
|---|---|
| F16L 11/00 | (2006.01) |
| F16L 9/14 | (2006.01) |
| F16L 21/00 | (2006.01) |
| F16L 51/02 | (2006.01) |
| F16L 11/12 | (2006.01) |
| F16L 59/16 | (2006.01) |
| F16L 27/111 | (2006.01) |
| F16L 11/16 | (2006.01) |
| F01N 13/18 | (2010.01) |

(52) U.S. Cl.
CPC ........... *F01N 13/1816* (2013.01); *F16L 27/111* (2013.01); *F16L 11/16* (2013.01); *F16L 51/025* (2013.01)
USPC .............. 138/121; 138/148; 285/49; 285/226

(58) Field of Classification Search
CPC ...... F01N 13/18; F01N 13/1816; F16L 11/16; F16L 27/111; F16L 51/025
USPC .............. 138/118.1, 121, 122, 129, 148, 118, 138/130–139, 147; 181/228, 247, 248; 285/49, 226; 123/65 EM
See application file for complete search history.

(56) References Cited

U.S. PATENT DOCUMENTS 3,915,482 A * 10/1975 Fletcher et al. ................ 285/226
4,106,798 A   8/1978 Haug
(Continued)

FOREIGN PATENT DOCUMENTS

DE   4202808 A1 *  8/1993
EP      974741 A1 *  1/2000
(Continued)

*Primary Examiner* — Patrick F Brinson
*Assistant Examiner* — Matthew Lembo
(74) *Attorney, Agent, or Firm* — Carrier Blackman & Associates, P.C.; Joseph P. Carrier; William D. Blackman

(57) ABSTRACT

A flexible tube includes a bellows tube, an interlock tube placed inside the bellows tube, and upstream-side and downstream-side joint pipes coupled to opposite ends of the bellows tube. Diameters of fixing end portions located at opposite ends of the interlock tube are made larger than a diameter at a middle portion of the interlock tube, extension portions of the upstream-side and downstream-side joint pipes are fitted and fixed to inner peripheral surfaces of the fixing end portions of the interlock tube, and a depth of each of valley portions of a bellows portion of the bellows tube located over the fixing end portions is smaller than a depth of other valley portions of the bellows portion. Accordingly, it is possible to achieve the downsizing of the flexible tube that is connected to an exhaust system being continuous with an engine to dampen vibrations in the axial direction of the exhaust system.

20 Claims, 7 Drawing Sheets

(56) References Cited

U.S. PATENT DOCUMENTS

| | | | |
|---|---|---|---|
| 5,403,044 A * | 4/1995 | Holl | 285/114 |
| 5,511,828 A | 4/1996 | Kurek et al. | |
| 5,660,419 A * | 8/1997 | Kim | 285/226 |
| 6,125,889 A * | 10/2000 | Elsasser et al. | 138/118 |
| 6,848,478 B2 * | 2/2005 | Nagai | 138/112 |
| 6,902,202 B2 * | 6/2005 | Huber | 285/226 |
| 2008/0012297 A1 * | 1/2008 | Heil et al. | 285/226 |

FOREIGN PATENT DOCUMENTS

| | | | |
|---|---|---|---|
| EP | 1152135 A2 | * | 11/2001 |
| JP | 56-71589 U | | 6/1981 |
| JP | 57-24391 U | | 2/1982 |
| JP | 58-42483 U | | 3/1983 |
| JP | 7-42548 A | | 2/1995 |
| JP | 7-259552 A | | 10/1995 |
| JP | 2003-314273 A | | 11/2003 |
| JP | 2003314273 A | * | 11/2003 |

* cited by examiner

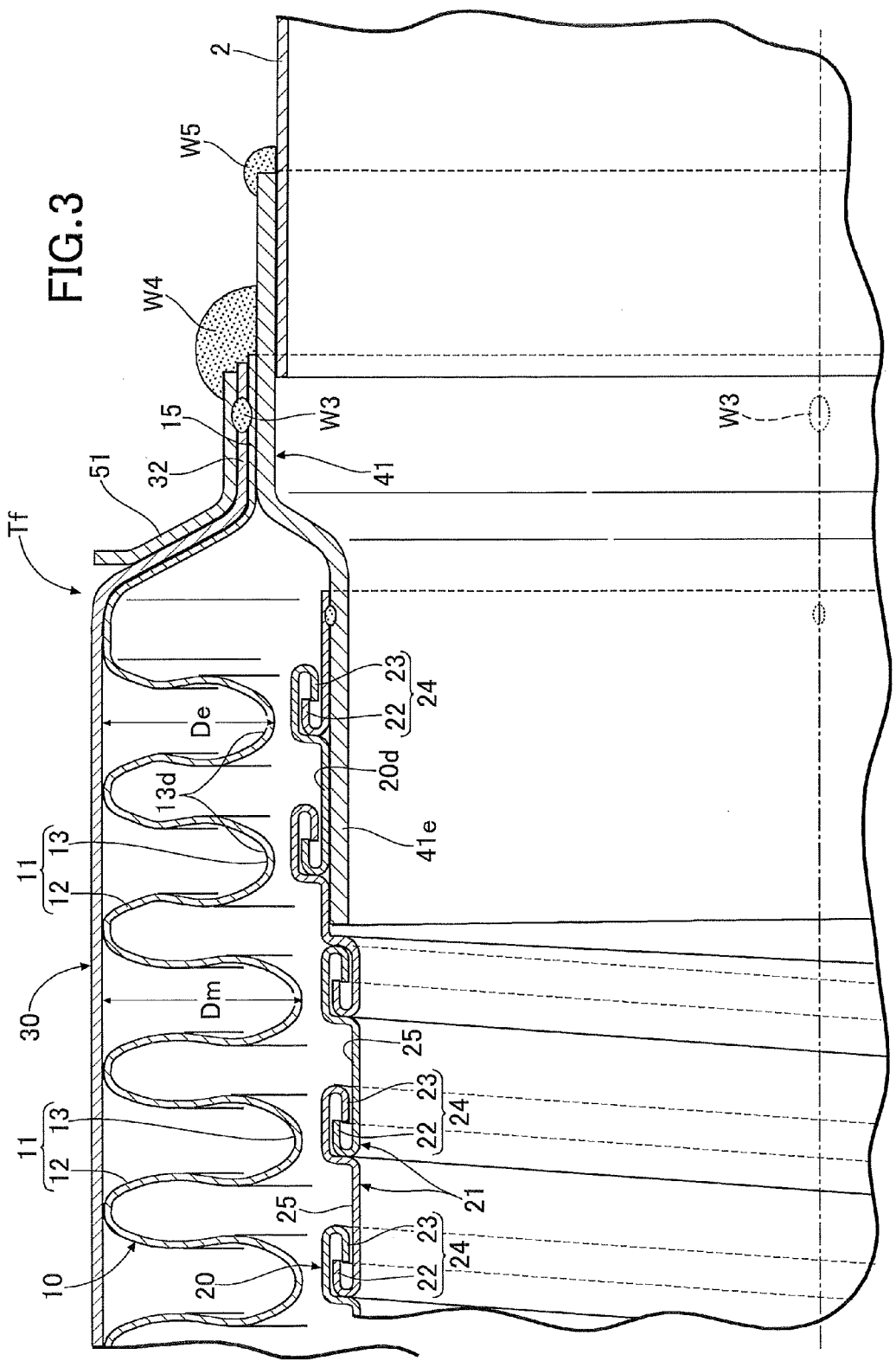

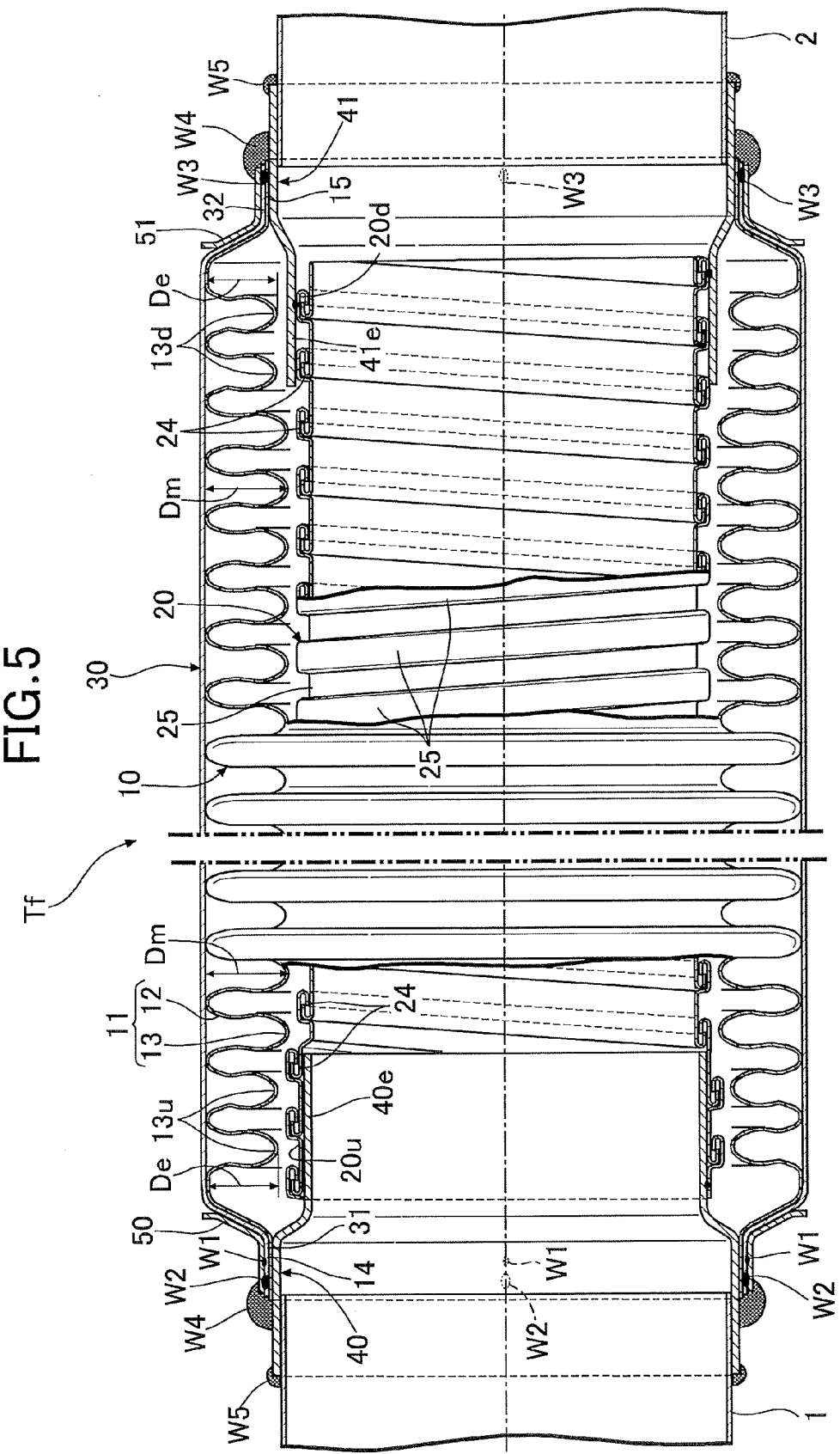

FLEXIBLE VIBRATION ABSORBING TUBE

CROSS-REFERENCE TO RELATED APPLICATIONS

The present application claims priority under 35 USC §119 based on Japanese patent application No. 2009-228073, filed 30 Sep. 2009. The subject matter of this priority document is incorporated herein by reference.

BACKGROUND OF THE INVENTION

1. Field of the Invention

The present invention relates to a flexible tube, and particularly to a flexible tube serving as a vibration-absorbing pipe connected to the exhaust system of an engine mainly for vehicles or the like to absorb the vibrations from the engine.

2. Description of the Related Art

The exhaust system for a vehicle is conventionally formed by connecting a catalytic converter, a sub muffler, a main muffler, and the like to an exhaust pipe extending from an exhaust manifold of an engine. To prevent the propagation of vibrations from the engine to the mufflers and the like situated at the rear stage of the exhaust system, it is known, for example, to provide a flexible tube serving as a vibration-absorbing pipe in the course of the exhaust pipe between the exhaust manifold and the catalytic converter so that the vibration from the engine can be absorbed.

For example, Japanese Patent Application Laid-open No. 7-42548 discloses a flexible tube including a cylindrical bellows tube, a cylindrical interlock tube placed inside the bellows tube, an upstream-side joint pipe and a downstream-side joint pipe coupled respectively to the two coupling-end portions located at the opposite ends of the bellows tube. The bellows tube includes a bellows portion located between the two coupling-end portions. In the bellows portion, ridge portions and valley portions are alternately formed in the axial direction of the bellows tube. The upstream-side joint pipe and the downstream-side joint pipe each include extension portions which extend from a portion thereof coupled to the bellows tube towards the axial center thereof, and the extension portions are fitted and fixed respectively to the inner peripheral surfaces of fixing end portions that are located at the respective opposite ends of the interlock tube.

In the flexible tube disclosed in the above-described Japanese Patent Application Laid-open No. 7-42548, the extension portions of the upstream-side and the downstream-side joint pipes are fitted to the inner peripheral surface of the interlock tube formed with a constant diameter that does not change all along the length of the interlock tube. Accordingly, a "coupling step" is formed between the interlock tube and the tip end of the extension portion of each of the upstream-side and the downstream-side joint pipes. This "coupling step" expands the exhaust-gas passage between the upstream-side joint pipe and the downstream-side joint pipe.

However, the expansion of the exhaust-gas passage by such "coupling step" fails to effectively reduce the exhaust noise or to reduce the back pressure (a pressure preventing the exhaust gas from being discharged). Further, the very existence of the "coupling step" requires the outer diameter of the bellows tube to be expanded, causing a problem that the flexible tube has to be larger in size. In addition, the exhaust gas flowing through the exhaust-gas passage has turbulences of flow at the "coupling steps," which undesirably increases the flow resistance of the exhaust gas.

SUMMARY OF THE INVENTION

The present invention has been made in view of the above circumstances, and an object of the present invention is to provide a unique flexible tube capable of solving the problems of the conventional flexible tube described above.

In order to achieve the object, according to a first aspect and feature of the present invention, there is provided a flexible tube comprising: a cylindrical bellows tube; a cylindrical interlock tube placed inside the bellows tube; and upstream-side and downstream-side joint pipes respectively coupled to coupling end portions located at opposite ends of the bellows tube, wherein the bellows tube includes a bellows portion in which ridge portions and valley portions are alternately formed in an axial direction of the bellows tube between the coupling end portions thereof. The upstream-side and the downstream-side joint pipes include respective extension portions each extending from a portion thereof coupled to the bellows tube towards an axial center of the bellows tube. The extension portions are fitted and fixed to respective fixing end portions at opposite ends of the interlock tube. The interlock tube is formed such that a diameter of each of the fixing end portions thereof is larger than a diameter of the interlock tube measured at any position closer to an axial center of the interlock tube than the fixing end portions. The extension portions of the upstream-side and the downstream-side joint pipes are fitted and fixed to inner peripheral surfaces of the respective fixing end portions, and depths of the valley portions of the bellows portion that are located over outer peripheral surfaces of the fixing end portions of the interlock tube are smaller than a depth of each of the valley portions of the bellows portion that are located closer to the axial center of the bellows portion than the valley portions over the fixing end portions.

According to the first aspect and feature of the present invention, the interlock tube is formed such that the diameter of each of the fixing end portions located at the respective opposite ends of the interlock tube is larger than the diameter of the interlock tube measured at any position closer to the axial center than the fixing end portions. Accordingly, without reducing the diameters of the extension portions of the upstream-side and the downstream-side joint pipes configured to be fitted and fixed respectively to the inner peripheral surfaces of the fixing end portions, the diameter of the interlock tube measured at any position closer to the axial center can be reduced to an extent that the internal diameter of the interlock tube is substantially equal to the internal diameter of each of the extension portions. In other words, the "coupling steps" can be eliminated, and hence, the external diameter of the bellows tube can be made smaller. Consequently, the flexible tube can be made smaller in size without narrowing the exhaust-gas passage. In addition, the elimination of the "coupling steps" helps to reduce the flow resistance of the exhaust gas that flows through the exhaust-gas passage. In addition, while the external diameter of the bellows tube becomes smaller, the depth of each of the valley portions of the bellows portion that are located over the outer peripheral surfaces of the fixing end portions, with larger diameters, of the interlock tube is made smaller than the depth of each of the valley portions of the bellows portion that are located closer to the axial center than the valley portions over the fixing end portions. Accordingly, a certain clearance between the bellows tube and the interlock tube can be secured along the entire length of the interlock tube, so that the original function of the flexible tube to absorb vibrations can be preserved.

In order to achieve the object, according to a second aspect and feature of the present invention, there is provided a flexible tube comprising: a cylindrical bellows tube; a cylindrical interlock tube placed inside the bellows tube; and upstream-side and downstream-side joint pipes respectively coupled to coupling end portions located at opposite ends of the bellows tube, wherein the bellows tube includes a bellows portion in which ridge portions and valley portions are alternately formed in an axial direction of the bellows tube between the coupling end portions thereof. The upstream-side and the downstream-side joint pipes include respective extension portions each extending from a portion thereof coupled to the bellows tube towards an axial center of the bellows tube, the extension portions being fitted and fixed to respective fixing end portions at opposite ends of the interlock tube. The interlock tube is formed such that a diameter of one of the fixing end portions thereof is larger than a diameter of the interlock tube measured at any position closer to an axial center of the interlock tube than the one fixing end portion. The extension portion of one of the upstream-side and the downstream-side joint pipes is fitted and fixed to an inner peripheral surface of the one fixing end portion. The other one of the upstream-side and the downstream-side joint pipes is formed such that the extension portion thereof has a larger diameter than the extension portion of the one joint pipe. The extension portion of the other joint pipe is fitted and fixed to an outer peripheral surface of the other one of the fixing end portions of the interlock tube, and depths of the valley portions of the bellows portion that are located over outer peripheral surfaces of the fixing end portions of the interlock tube are smaller than a depth of each of the valley portions of the bellows portion that are located closer to the axial center of the bellows portion than the valley portions over the fixing end portions.

According to the second aspect and feature of the present invention, the extension portions of the upstream-side and the downstream-side joint pipes are fitted and fixed respectively to the fixing end portions located at the opposite ends of the interlock tube in the following manner. The diameter of one of the fixing end portions of the interlock tube is made larger, and the extension portion of the corresponding joint pipe is fitted and fixed to the inner peripheral surface of the one fixing end portion with the larger diameter. On the other hand, the diameter of the extension portion of the other joint pipe is made comparatively larger such that it is fitted and fixed to the outer peripheral surface of the other fixing end portion of the interlock tube. Accordingly, by increasing the diameter of only one of the fixing end portions of the interlock tube, advantageous effects similar to those obtainable by the first aspect and feature of the present invention can be obtained. In addition, the flexible tube provided by the second aspect and feature of the present invention can be more easily produced than the flexible tube provided by the first aspect and feature of the present invention, thereby reducing production cost.

The above description, other objects, characteristics and advantages of the present invention will be clear from detailed descriptions which will be provided for the exemplary embodiments shown in the attached drawings.

BRIEF DESCRIPTION OF THE DRAWINGS

FIG. 3 is an enlarged view of a part according to a first exemplary embodiment of the present invention surrounded by a virtual line shown by an arrow 3 in FIG. 2;

FIG. 5 is an enlarged cross-sectional view of a flexible tube according to a second exemplary embodiment of the present invention taken along a line 2-2 in FIG. 1.

DESCRIPTION OF THE PRESENT EXEMPLARY EMBODIMENTS

Hereinafter, descriptions will be provided for the exemplary embodiments of the present invention shown in the attached drawings.

The exemplary embodiments concern a case where the flexible tube of the present invention is applied to the exhaust system of an engine for an automobile. In the following description, the terms indicating directions, such as, "front," "rear," "right," "left," "up," and "down" are defined using the direction in which the automobile moves forward, as the reference.

Figure 1:
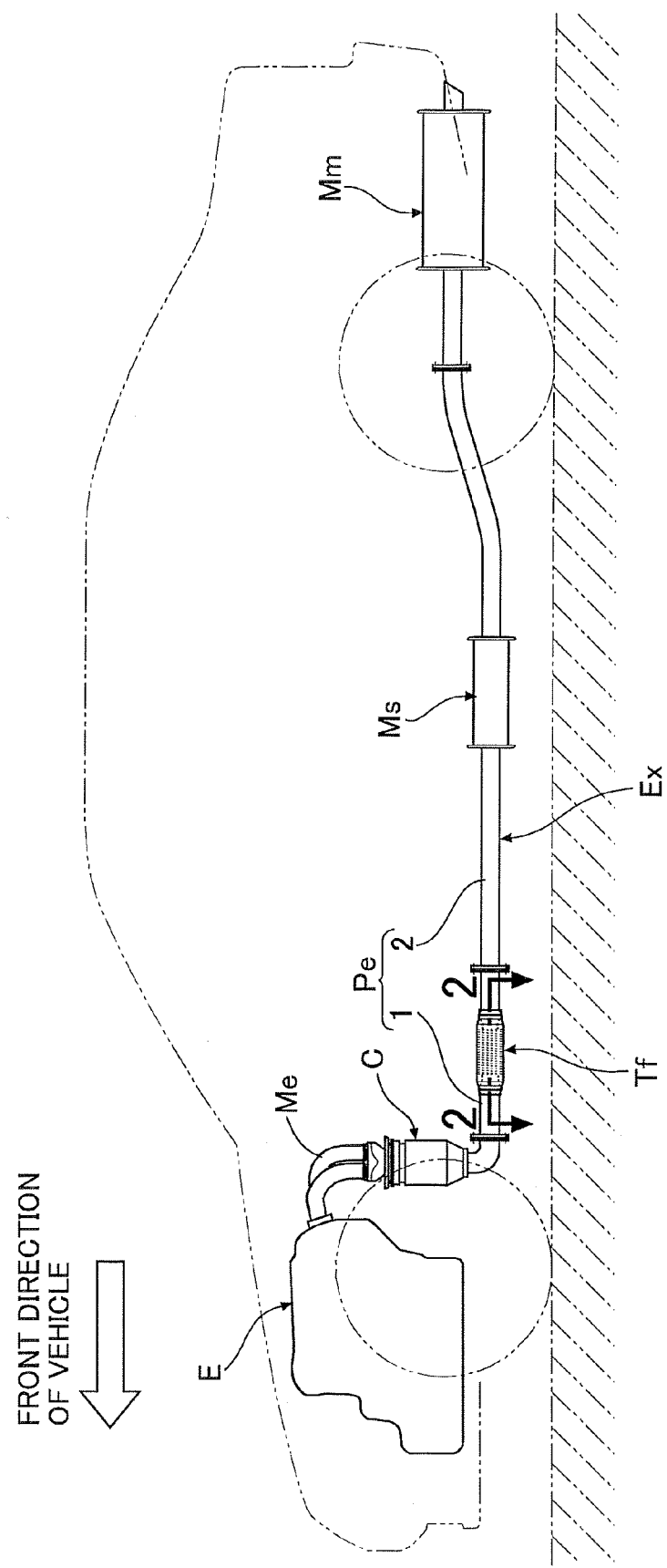
FIG. 1 is a side view of an entire exhaust system of an engine for a vehicle including a flexible tube according to the present invention.

In FIG. 1, in a front portion of an automobile, an engine E for driving the automobile is mounted in a transverse manner (with a crankshaft of the engine E extending in the right-and-left direction of the vehicle), and an exhaust system EX is connected to an exhaust port opened in the back-side surface of a top portion of the engine E. In the exhaust system EX, an exhaust pipe Pe is connected to the downstream side of an exhaust manifold Me connected integrally to the exhaust port. The exhaust pipe Pe extends in the front-and-rear direction under the floor of the automobile, and includes an upstream-side exhaust pipe 1 and a downstream-side exhaust pipe 2. A catalytic converter C is provided in the upstream-side exhaust pipe 1. A flexible tube Tf of the present invention is provided between the upstream-side exhaust pipe 1 and the downstream-side exhaust pipe 2. A sub muffler Ms and a main muffler Mm are connected to the downstream-side exhaust pipe 2.

An exhaust gas is discharged from the engine E while the engine E is running. After toxic components such as hydrocarbons (HC), carbon monoxide (CO), and nitrous oxides (NOX) contained in the exhaust gas is cleaned by the catalytic converter C, the exhaust gas passes through the sub muffler Ms where preliminary noise dampening is performed, then passes through the main muffler Mm where main noise dampening is performed, and is then discharged outside of the vehicle. The vibrations from the engine E are absorbed by the flexible tube Tf of the present invention.

Next, a first exemplary embodiment of the flexible tube Tf of the present invention will be described by referring to FIGS. 2 to 4.

The flexible tube Tf includes a cylindrical bellows tube 10, a cylindrical interlock tube 20 placed inside the bellows tube 10, an outer blade 30 covering the outer periphery of the bellows tube 10, an upstream-side joint pipe 40 coupled to a coupling end portion 14 located at one end of the bellows tube 10, and a downstream-side joint pipe 41 coupled to a coupling end portion 15 located at the other end of the bellows tube 10.

In a bellows portion (accordion portion) 11 which forms the main portion of the bellows tube 10, ridge portions 12 and valley portions 13 having loop-shaped sectional shapes formed alternately in the axial direction from one end side to the other end side of the bellows tube 10. The upstream-side and the downstream-side coupling end portions 14 and 15 are formed at the front-side and the rear-side ends of the bellows portion 11, respectively. The coupling end portions 14 and 15 each have a cylindrical shape with a diameter smaller than the external diameter of the bellows portion 11. The bellows tube 10 is formed so that depths De and De of valley portions 13u and 13d of the bellows portion 11 located over the outer peripheral surfaces of fixing end portions 20u and 20d at the opposite ends of the interlock tube 20 may be smaller than a depth Dm of each of the valley portions 13 located at positions closer to the axial center than the valley portions 13u and 13d. As will be understood from the foregoing, the term "depth" as used herein pertains to a distance to which the valley portions extend radially inwardly of the flexible tube from the outer blade 30, and hence are a relative indication of the distance from the innermost point of the valley from the axial centerline of the flexible tube. In other words, the valley portions having the smaller depth De do not extend as closely to the axial center line of the flexible tube as do the valley portions having the larger depth Dm.

As FIG. 3 clearly shows, the interlock tube 20 is formed to have a cylindrical shape by continuously winding, in a spiral manner, a band-plate material 21 having hook-shaped side edges formed on its opposite sides. The plate material 21 has hook-shaped portions 22 and 23 at its respective opposite side edges. The interlock tube 20 includes an interlock mechanism 24 formed of the hook-shaped portions 22 and 23 engaged to be movable relative to each other within a predetermined range in the axial direction. Between each two adjacent portions of the interlock mechanism 24, a dent portion 25 is formed so as to be continuous, in a spiral manner, from one end side of the interlock tube 20 to the other end side thereof.

Each of the fixing end portions 20u and 20d formed respectively at the upstream side end and at the downstream side end of the interlock tube 20 is formed to have a cylindrical shape, and the diameter of each of the fixing end portions 20u and 20d is larger than the diameter of the interlock tube 20 measured at any position closer to the axial center than the fixing end portions 20u and 20d. The outer peripheral surfaces of extension portions 40e and 41e of the upstream-side and the downstream-side joint pipes 40 and 41 are fitted to and fixed to the inner peripheral surfaces of the fixing end portions 20u and 20d. Each of the extension portions 40e and 41e is formed to have a smaller diameter than other portions of each of the joint pipes 40 and 41.

Figure 2:
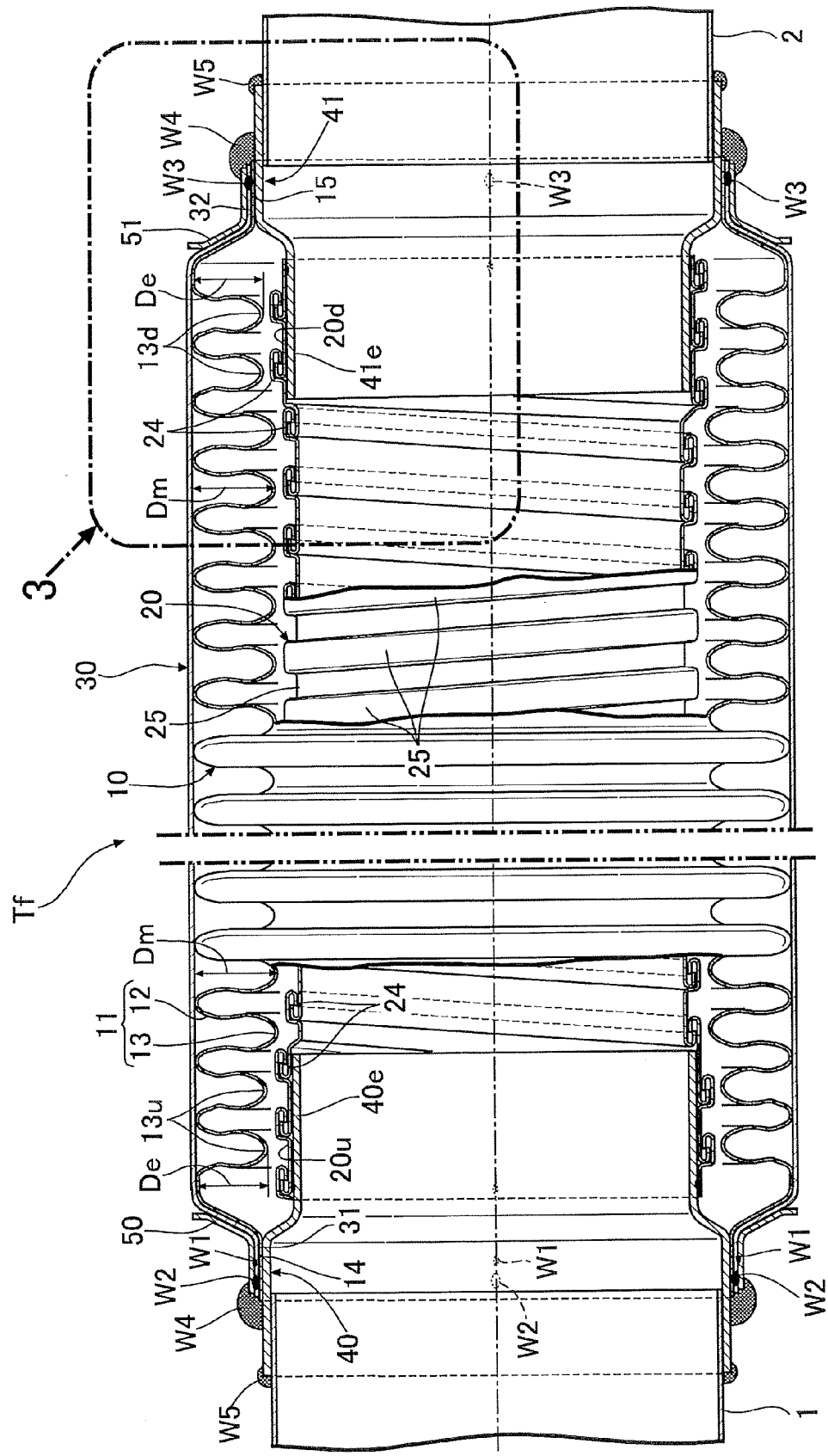
FIG. 2 is an enlarged cross-sectional view of the flexible tube according to a first exemplary embodiment of the present invention taken along a line 2-2 in FIG. 1.

As FIGS. 2 and 3 show, the internal diameter of each of the extension portions 40e and 41e of the upstream-side and the downstream-side joint pipes 40 and 41 is substantially equal to the internal diameter of a middle portion of the interlock tube 20 (refers to the portion excluding the fixing end portions 20u and 20d), so that no step is formed between the interlock tube middle portion and each of the extension portions 40e and 41e.

The outer blade 30 is formed to have a cylindrical shape, and the tops of the ridge portions 12 of the bellows tube 10 are in contact with the inner peripheral surface of the outer blade 30. Each of the front-side and the rear-side end portions of the outer blade 30 has a diameter that becomes gradually smaller, and connecting end portions 31 and 32 are formed respectively on the front-side and the rear-side ends of the outer blade 30. Ring-shaped caps 50 and 51 are joined respectively by welding to the outer peripheral surfaces of the opposite ends of the outer blade 30.

The upstream-side and the downstream-side exhaust pipes 1 and 2 are joined respectively by welding to the inner peripheral surfaces of the outer ends of the upstream-side and the downstream-side joint pipes 40 and 41.

Subsequently, processes of assembling the flexible tube Tf of the first exemplary embodiment will be described by referring to FIGS. 4A to 4D.

Figure 4A:
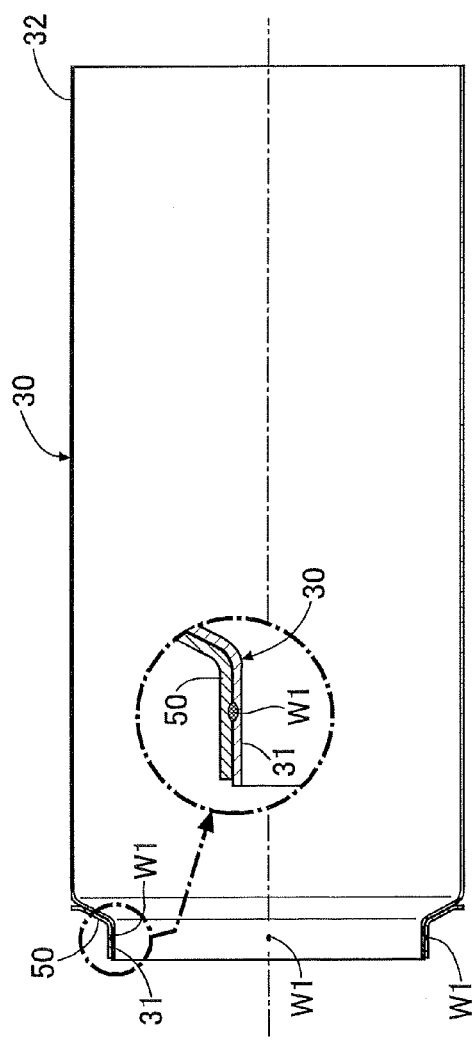
FIGS. 4A to 4D are views showing assembly steps of the flexible tube according to a first exemplary embodiment of the present invention.

(1) As FIG. 4A shows the upstream-side cap 50 is joined by spot-welding W1 to the outer peripheral surface of the upstream-side connecting end portion 31 of the outer blade 30 at four peripheral positions. At this stage, the diameter of the downstream-side connecting end portion 32 of the outer blade 30 has not been decreased yet to enable the inserting of the bellows tube 10 into the outer blade 30 at the following step (2).

Figure 4B:
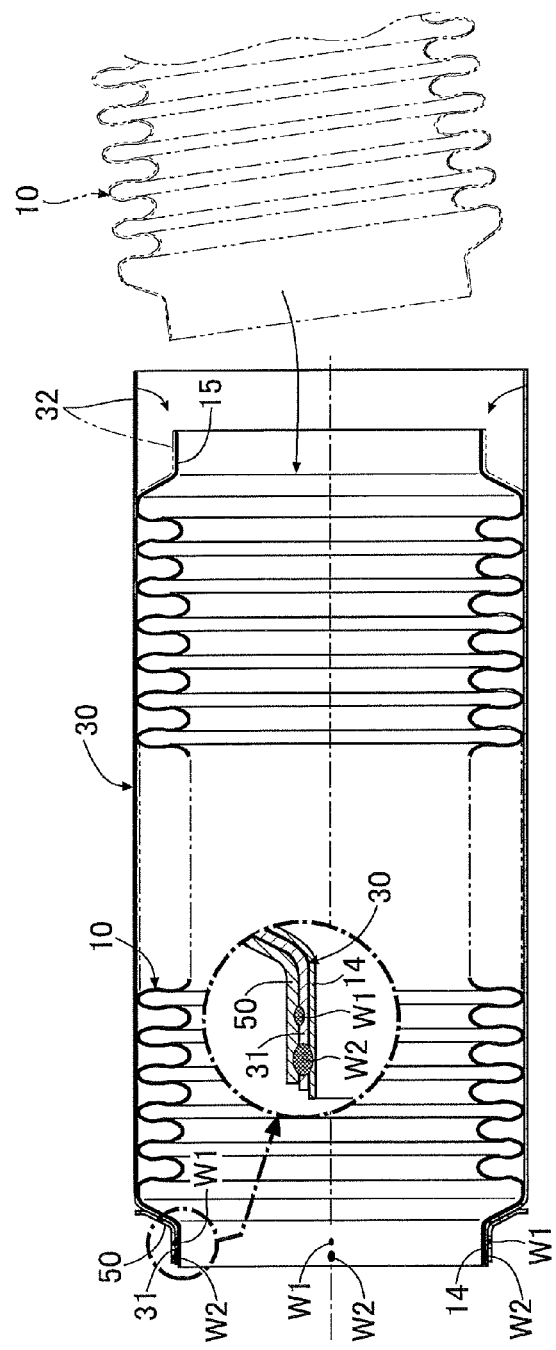

(2) As FIG. 4B shows, the bellows tube 10 is inserted into the outer blade 30 through the downstream-side connecting end portion 32 whose diameter has not been reduced yet. The three members, namely, the upstream-side coupling end portion 14 of the bellows tube 10, the upstream-side connecting end portion 31 of the outer blade 30, and the upstream-side cap 50 are joined by spot-welding W2 at four peripheral positions.

Figure 4C:
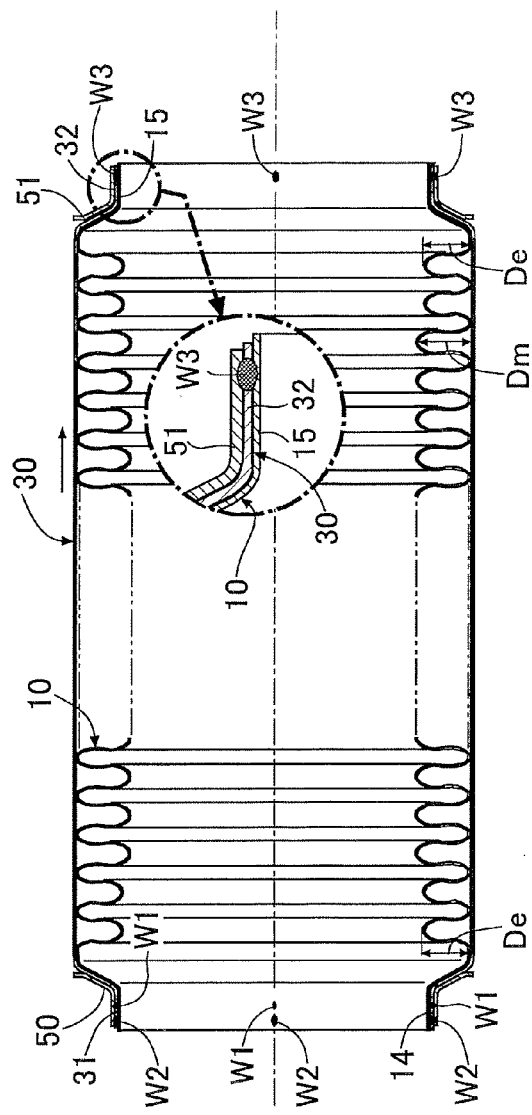

(3) As FIG. 4C shows, after the spring force of the outer blade 30 is adjusted by pushing the bellows tube 10 towards the upstream side and pulling the outer blade 30 towards the downstream side, the diameter of the downstream-side connecting end portion 32 of the outer blade 30 is decreased. Then, the three members, namely, the downstream-side coupling end portion 15 of the bellows tube 10, the downstream-side connecting end portion 32 of the outer blade 30, and the downstream-side cap 51 are joined by spot-welding W3 at four peripheral positions.

Figure 4D:
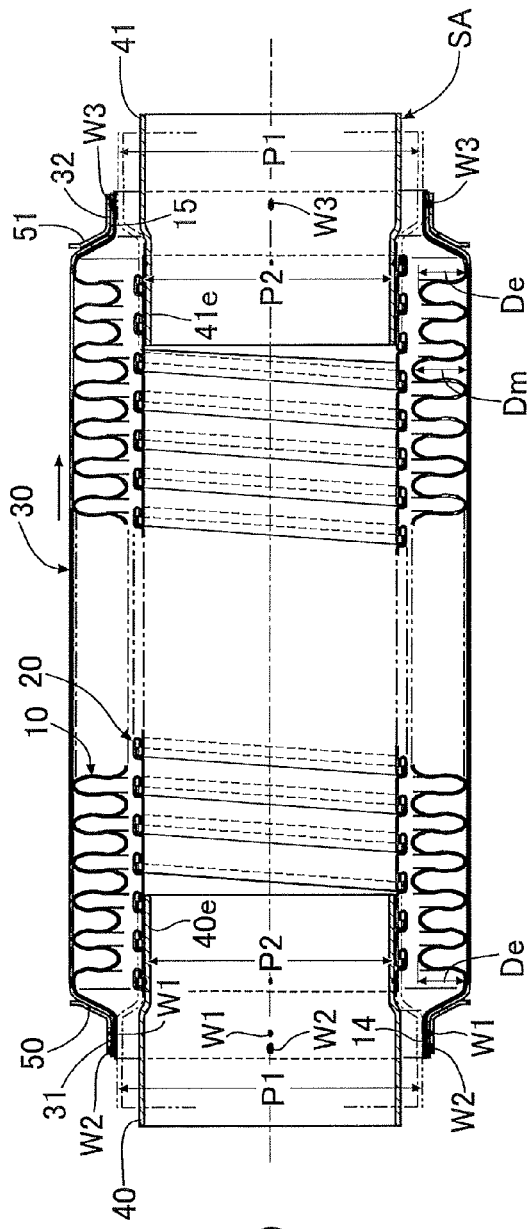

(4) As FIG. 4D shows, after a sub-assembly SA including the upstream-side and the downstream-side joint pipes 40 and 41 and the interlock tube 20 is inserted into the bellows tube 10 to a predetermined position, the diameter of each of the upstream-side joint pipe 40 and the downstream-side joint pipe 41 is expanded at two axial positions P1 and P2 (the diameter-expansion processing at the two positions P1 and P2 may be performed simultaneously or separately). Consequently, the diameters of the upstream-side and the downstream-side fixing end portions 20u and 20d of the interlock tube 20 are expanded as well.

As FIG. 2 shows, the upstream-side joint pipe 40, the upstream-side coupling end portion 14 of the bellows tube 10, the upstream-side connecting end portion 31 of the outer blade 30, and the upstream-side cap 50 are joined together by welding W4 all along the periphery, and the downstream-side joint pipe 41, the downstream-side coupling end portion 15 of the bellows tube 10, the downstream-side connecting end portion 32 of the outer blade 30, and the downstream-side cap 51 are joined together by welding W4 all along the periphery.

With the processes described above, the flexible tube Tf is completed.

The upstream-side and the downstream-side exhaust pipes 1 and 2 are fitted respectively to the upstream-side and the downstream-side joint pipes 40 and 41 of the flexible tube Tf from the inside, and are joined together by welding W5. As FIG. 1 shows, the flexible tube Tf is thus connected between the upstream-side exhaust pipe 1 and the downstream-side exhaust pipe 2 of the exhaust system Ex.

The diameter of each of the fixing end portions 20u and 20d located at the opposite ends of the interlock tube 20 of the flexible tube Tf of the first exemplary embodiment is larger than the diameter of the interlock tube 20 measured at any position closer to the axial center than the fixing end portions 20u and 20d. Thus, without decreasing the diameters of the extension portions 40e and 41e of the upstream-side and the downstream-side joint pipes 40 and 41, respectively, that are fitted and fixed respectively to the inner peripheral surfaces of the fixing end portions 20u and 20d, the diameter of the interlock tube 20 measured at any position closer to the axial center can be reduced to an extent that the internal diameter of the interlock tube 20 is substantially equal to the internal diameter of each of the extension portions 40e and 41e.

Accordingly, the above-described "coupling steps" can be eliminated, so that the external diameter of the bellows tube 10 can thus be made smaller. Accordingly, the flexible tube Tf can be made smaller in size without narrowing the exhaust-gas passage. Additionally the elimination of the "coupling steps" helps to reduce the flow resistance of the exhaust gas that flows through the exhaust-gas passage. Further, even though the external diameter of the bellows tube 10 is decreased, the depths De and De of the valley portions 13$u$ and 13$d$ of the bellows portion 11 located over the outer peripheral surfaces of the fixing end portions 20$u$ and 20$d$ of the interlock tube 20 with expanded diameters are made smaller than the depth Dm of each of the valley portions 13 of the bellows portion 11 located at positions closer to the axial center than the valley portions 13$u$ and 13$d$. For this reason, a certain clearance between the bellows tube 10 and the interlock tube 20 can be secured along the entire length of the interlock tube 20, and the primary function of the flexible tube Tf to absorb vibrations can be preserved.

Next, a second exemplary embodiment of the flexible tube Tf of the present invention will be described by referring to FIGS. 5 and 6.

In the second exemplary embodiment, portions that are the same as those in the first exemplary embodiment bear the same reference numerals as those used in the first exemplary embodiment.

In the second exemplary embodiment, an interlock tube 20 is formed such that an upstream-side fixing end portion 20$u$ thereof has a larger diameter than the interlock tube 20 measured at any position closer to the axial center than the upstream-side fixing end portion 20$u$, whereas a downstream-side fixing end portion 20$d$ thereof has the same diameter as the interlock tube 20 measured at any position closer to the axial center than the downstream-side fixing end portion 20$d$. In addition, an upstream-side joint pipe 40 is formed such that an extension portion 40$e$ thereof has a smaller diameter than an extension portion 41$e$ of a downstream-side joint pipe 41. Then, the outer peripheral surface of the extension portion 40$e$ of the upstream-side joint pipe 40 is fitted and fixed to the inner peripheral surface of the upstream-side fixing end portion 20$u$ of the interlock tube 20, whereas the inner peripheral surface of the extension portion 41$e$ of the downstream-side joint pipe 41 is fitted and fixed to the outer peripheral surface of the downstream-side fixing end portion 20$d$ of the interlock tube 20. In addition, upstream-side and downstream-side valley portions 13$u$ and 13$d$ of a bellows portion 11 located over the outer peripheral surfaces of the upstream-side and the downstream-side fixing end portions 20$u$ and 20$d$ of the interlock tube 20, respectively, are formed to have depths De and De smaller than a depth Dm of each valley portion 13 of the bellows portion 11 closer to the axial center than the valley portions 13$u$ and 13$d$.

Next, processes for assembling the flexible tube Tf of the second exemplary embodiment will be described. In the second exemplary embodiment, a process (4)', which will be described below, is performed instead of the process (4) of the assembling processes (1) to (5) of the first exemplary embodiment, and the other processes are the same as those performed in the first exemplary embodiment.

Figure 6:
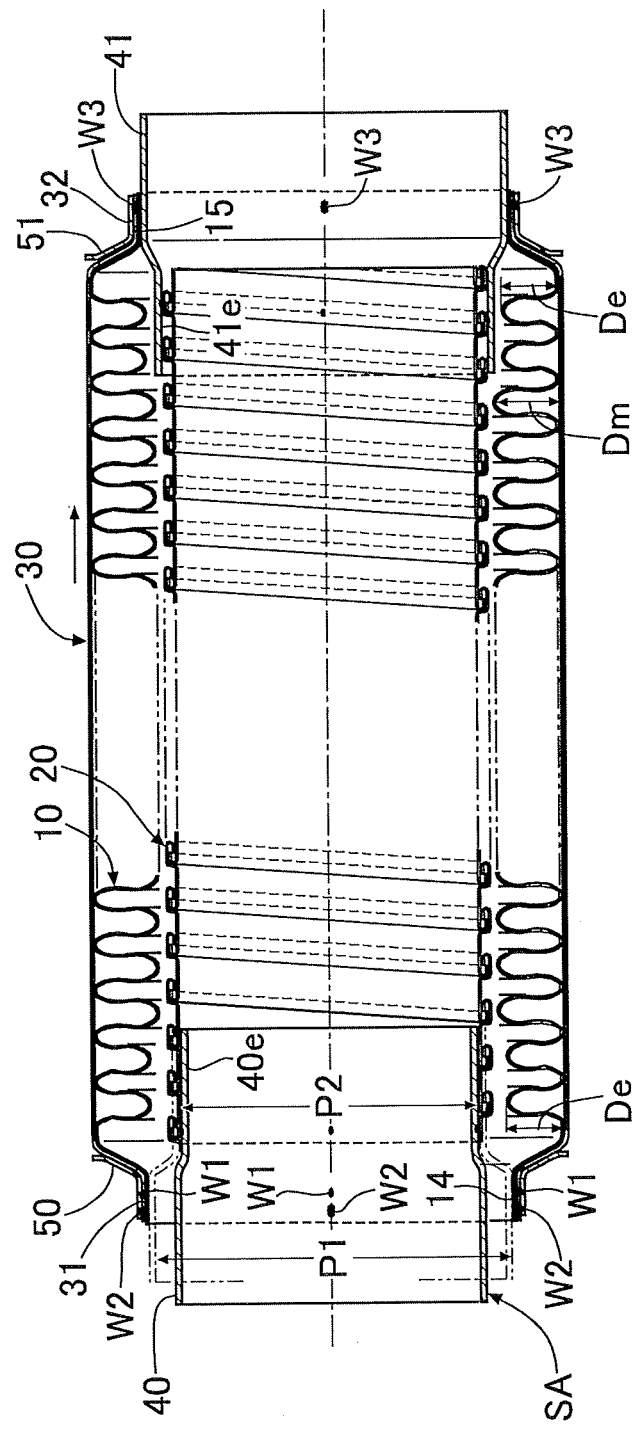
FIG. 6 is a view showing an assembly step of the flexible tube according to a second exemplary embodiment of the present invention.

(4)' After a sub-assembly SA including the upstream-side and the downstream side joint pipes 40 and 41 and the interlock tube 20 is inserted into a bellows tube 10 to a predetermined position, the diameter of the upstream-side joint pipe 40 is expanded at two axial positions P1 and P2 (the diameter-expansion processing at the two positions may be performed simultaneously or separately) as shown in FIG. 6. Consequently, the diameter of the upstream side of the interlock tube 20 is expanded as well (see FIG. 6).

According to the second exemplary embodiment, the extension portions 40$e$ and 41$e$ of the upstream-side and the downstream-side joint pipes 40 and 41 are fitted and fixed to the fixing end portions 20$u$ and 20$d$ located at the opposite ends of the interlock tube 20, respectively, in the following manner. The diameter of the upstream-side fixing end portion 20$u$ of the interlock tube 20 is made larger, and the extension portion 40$e$ of the upstream-side joint pipe 40 is fitted and fixed to the inner peripheral surface of the upstream-side fixing end portion 20$u$. On the other hand, the diameter of the extension portion 41$e$ of the downstream-side joint pipe 41 is made comparatively larger such that it is fitted and fixed to the outer peripheral surface of the downstream-side fixing end portion 20$d$ of the interlock tube 20. Accordingly, only by expanding the diameter of the upstream-side fixing end portion 20$u$, the interlock tube 20 can have the same advantageous effects as those obtained by the first exemplary embodiment. In addition, the production efficiency of the flexible tube Tf of the second exemplary embodiment is better than that of the first exemplary embodiment, so that the production cost for the flexible tube Tf can be decreased.

The exemplary embodiments of the present invention have been described thus far, but the present invention is not limited to the above-described exemplary embodiments, and may be modified in a variety of ways as long as the modifications do not depart from the gist of the present invention.

For example, the above-described exemplary embodiments have been described based on a case where the flexible tube of the present invention is applied to the exhaust system Ex of the engine E for an automobile, but the flexible tube of the present invention may be applied to the exhaust system of an engine for other uses, such as a utility engine, or may be applied to a piping of other kinds that suffers from vibrations in the axial direction.

As another example, the flexible tube Tf of the second exemplary embodiment may alternatively be formed as follows. The interlock tube 20 is formed such that the downstream-side fixing end portion 20$d$ thereof has a larger diameter than the interlock tube 20 measured at any position closer to the axial center than the downstream-side fixing end portion 20$d$, whereas the upstream-side fixing end portion 20$u$ thereof has the same diameter as the interlock tube 20 measured at any position closer to the axial center than the upstream-side fixing end portion 20$u$. In addition, the downstream-side joint pipe 41 is formed such that the extension portion 41$e$ thereof has a smaller diameter than the extension portion 40$e$ of the upstream-side joint pipe 40. Then, the outer peripheral surface of the extension portion 41$e$ of the downstream-side joint pipe 41 is fitted and fixed to the inner peripheral surface of the downstream-side fixing end portion 20$d$ of the interlock tube 20, whereas the inner peripheral surface of the extension portion 40$e$ of the upstream-side joint pipe 40 is fitted and fixed to the outer peripheral surface of the upstream-side fixing end portion 20$u$ of the interlock tube 20.

What is claimed is:
1. A flexible tube comprising:
a cylindrical bellows tube;
a cylindrical interlock tube placed inside the bellows tube; and
upstream-side and downstream-side joint pipes respectively coupled to coupling end portions formed at opposite ends of the bellows tube,
wherein the bellows tube includes a bellows portion in which ridge portions and valley portions are alternately formed in an axial direction of the bellows tube between the coupling end portions thereof, the upstream-side and the downstream-side joint pipes include respective extension portions each extending from a portion thereof coupled to the bellows tube towards a center of the bellows tube in the axial direction of the bellows tube, the extension portions being fitted and fixed to respective fixing end portions at opposite ends of the interlock tube, the interlock tube is formed such that the fixing end portions thereof are enlarged in diameter as compared with a middle portion of the interlock tube on an inner side in an axial direction of the interlock tube and a diameter of each of the fixing end portions thereof is larger than a diameter of the interlock tube at the middle portion, the extension portions of the upstream-side and the downstream-side joint pipes are fitted and fixed to inner peripheral surfaces of the respective fixing end portions, and depths of the valley portions of the bellows portion that are located over outer peripheral surfaces of the fixing end portions of the interlock tube are smaller than a depth of each of the valley portions of the bellows portion that are located closer to the center of the bellows portion in the axial direction than the valley portions over the fixing end portions.

2. The flexible tube according to claim 1, wherein the interlock tube is placed inside the bellows tube with a clearance between the valley portions of the bellows portion and an outer periphery of the interlock tube along the entire bellows portion.

3. The flexible tube according to claim 2, wherein the clearance is substantially constant along the entire bellows portion.

4. The flexible tube according to claim 1, wherein an inner diameter of the extension portions of the joint pipes fitted and fixed to the inner peripheral surfaces of the respective fixing end portions of the interlock tube is substantially the same as an inner diameter of the middle portion of the interlock tube between the fixing end portions thereof.

5. The flexible tube according to claim 1, wherein the interlock tube comprises:
a band-plate material having hook-shaped portions formed on its opposite edges, said band-plate material being continuously wound in a spiral manner;
an interlock mechanism formed of the hook-shaped portions which are engaged to be movable relative to each other within a predetermined range in the axial direction; and
a dent portion located between each two adjacent portions of the interlock mechanism.

6. The flexible tube according to claim 1, further comprising an outer blade which surrounds the bellows tube and has an outer diameter which is constant over an entire length of the interlock tube,
wherein the depths of the valley portions of the bellows portion are set such that, as measured from the outer blade, the depth of each of the valley portions over the fixing end portions is smaller than that of each of the valley portions located closer to the center of the bellows portions in the axial direction.

7. A flexible tube comprising:
a cylindrical bellows tube;
a cylindrical interlock tube placed inside the bellows tube; and upstream-side and downstream-side joint pipes respectively coupled to coupling end portions formed at opposite ends of the bellows tube, wherein the bellows tube includes a bellows portion in which ridge portions and valley portions are alternately formed in an axial direction of the bellows tube between the coupling end portions thereof, the upstream-side and the downstream-side joint pipes include respective extension portions each extending from a portion thereof coupled to the bellows tube towards a center of the bellows tube in the axial direction of the bellows tube, the extension portions being fitted and fixed to respective fixing end portions at opposite ends of the interlock tube, the interlock tube is formed such that one of the fixing end portions thereof is enlarged in diameter as compared with a remaining portion of the interlock tube in an axial direction of the interlock tube and a diameter of the one fixing end portion is larger than a diameter of the interlock tube at the remaining portion, the extension portion of one of the upstream-side and the downstream-side joint pipes is fitted and fixed to an inner peripheral surface of the one fixing end portion, the other one of the upstream-side and the downstream-side joint pipes is formed such that the extension portion thereof has a larger diameter than the extension portion of the one joint pipe, the extension portion of the other joint pipe is fitted and fixed to an outer peripheral surface of the other one of the fixing end portions of the interlock tube, and depths of the valley portions of the bellows portion that are located over outer peripheral surfaces of the fixing end portions of the interlock tube are smaller than a depth of each of the valley portions of the bellows portion that are located closer to the center of the bellows portion in the axial direction thereof than the valley portions over the fixing end portions.

8. The flexible tube according to claim 7, wherein the interlock tube is placed inside the bellows tube with a clearance between the valley portions of the bellows portion and an outer periphery of the interlock tube along the entire bellows portion.

9. The flexible tube according to claim 8, wherein the clearance is substantially constant along the entire bellows portion.

10. The flexible tube according to claim 7, wherein an inner diameter of the extension portion of the one joint pipe fitted and fixed to the inner peripheral surface of the one fixing end portion of the interlock tube is substantially the same as an inner diameter of the remaining portion of the interlock tube.

11. The flexible tube according to claim 7, wherein the interlock tube comprises:
a band-plate material having hook-shaped portions formed on its opposite edges, said band-plate material being continuously wound in a spiral manner;
an interlock mechanism formed of the hook-shaped portions which are engaged to be movable relative to each other within a predetermined range in the axial direction; and
a dent portion located between each two adjacent portions of the interlock mechanism.

12. The flexible tube according to claim 7, further comprising an outer blade which surrounds the bellows tube and has an outer diameter which is constant over an entire length of the interlock tube,
wherein the depths of the valley portions of the bellows portion are set such that, as measured from the outer blade, the depth of each of the valley portions over the fixing end portions is smaller than that of each of the valley portions located closer to the center of the bellows portions in the axial direction.

13. A flexible tube comprising:
a cylindrical bellows tube;
a cylindrical interlock tube placed inside the bellows tube; and
upstream-side and downstream-side joint pipes respectively coupled to coupling end portions formed at opposite ends of the bellows tube,
wherein the bellows tube includes a bellows portion in which ridge portions and valley portions are alternately formed in an axial direction of the bellows tube between the coupling end portions thereof,
the upstream-side and the downstream-side joint pipes include respective extension portions each extending from a portion thereof coupled to the bellows tube towards a center of the bellows tube in the axial direction of the bellows tube, the extension portions being fitted and fixed to respective fixing end portions at opposite ends of the interlock tube,
a flow path defined within the interlock tube along the entire length thereof, including the fixing end portions thereof, having the extension portions fitted and fixed thereto and an intermediate portion between the fixing end portions, has a substantially constant inner diameter, and
depths of the valley portions of the bellows portion that are located over outer peripheral surfaces of the fixing end portions of the interlock tube are smaller than a depth of each of the valley portions of the bellows portion that are located closer to the center of the bellows portion in the axial direction thereof than the valley portions over the fixing end portions.

14. The flexible tube according to claim 13, wherein
the interlock tube is formed such that a diameter of the fixing end portion on an upstream-side thereof is larger than a diameter of the interlock tube measured at any position closer to a center of the interlock tube in an axial direction thereof than the fixing end portion on the upstream-side,
the extension portion of the upstream-side joint pipe is fitted and fixed to an inner peripheral surface of the fixing end portion on the upstream-side,
the downstream-side joint pipe is formed such that the extension portion thereof has a larger diameter than the extension portion of the upstream-side joint pipe, and
the extension portion of the downstream-side joint pipe is fitted and fixed to an outer peripheral surface of the fixing end portion on a downstream-side of the interlock tube.

15. The flexible tube according to claim 13, wherein
the interlock tube is formed such that a diameter of the fixing end portion on an downstream-side thereof is larger than a diameter of the interlock tube measured at any position closer to a center of the interlock tube in an axial direction thereof than the fixing end portion on the downstream-side, the extension portion of the downstream-side joint pipe is fitted and fixed to an inner peripheral surface of the fixing end portion on the downstream-side,
the upstream-side joint pipe is formed such that the extension portion thereof has a larger diameter than the extension portion of the downstream-side joint pipe, and
the extension portion of the upstream-side joint pipe is fitted and fixed to an outer peripheral surface of the fixing end portion on an upstream-side of the interlock tube.

16. The flexible tube according to claim 13, wherein
the upstream-side and the downstream-side joint pipes include respective extension portions each extending from a portion thereof coupled to the bellows tube towards the center of the bellows tube in the axial direction, the extension portions being fitted and fixed to respective fixing end portions at opposite ends of the interlock tube,
the interlock tube is formed such that a diameter of each of the fixing end portions thereof is larger than a diameter of the interlock tube measured at any position closer to a center of the interlock tube in an axial direction of the interlock tube than the fixing end portions,
the extension portions of the upstream-side and the downstream-side joint pipes are fitted and fixed to inner peripheral surfaces of the respective fixing end portions.

17. The flexible tube according to claim 13, wherein the interlock tube is placed inside the bellows tube with a clearance between the valley portions of the bellows portion and an outer periphery of the interlock tube along the entire bellows portion.

18. The flexible tube according to claim 17, wherein the clearance is substantially constant along the entire bellows portion.

19. The flexible tube according to claim 13, wherein the interlock tube comprises:
a band-plate material having hook-shaped portions formed on its opposite edges, said band-plate material being continuously wound in a spiral manner;
an interlock mechanism formed of the hook-shaped portions which are engaged to be movable relative to each other within a predetermined range in the axial direction; and
a dent portion located between each two adjacent portions of the interlock mechanism.

20. The flexible tube according to claim 13, further comprising an outer blade which surrounds the bellows tube and has an outer diameter which is constant over an entire length of the interlock tube,
wherein the depths of the valley portions of the bellows portion are set such that, as measured from the outer blade, the depth of each of the valley portions over the fixing end portions is smaller than that of each of the valley portions located closer to the center of the bellows portions in the axial direction.

* * * * *